Dec. 2, 1958 C. E. THEALL, JR., ET AL 2,863,048

CLIPPER-AMPLIFIER AND PULSE GENERATOR CIRCUIT

Filed July 6, 1953 2 Sheets-Sheet 1

Inventors:
Charles Earle Theall, Jr.
Curtis D. Cockburn,
by Charles M. Hutchins
Their Attorney.

CLIPPER-AMPLIFIER AND PULSE GENERATOR CIRCUIT

Filed July 6, 1953 2 Sheets-Sheet 2

Inventors:
Charles Earle Theall, Jr.
Curtis D. Cockburn,
by Charles M. Hutchins
Their Attorney.

2,863,048

CLIPPER-AMPLIFIER AND PULSE GENERATOR CIRCUIT

Charles Earle Theall, Jr., Liverpool, and Curtis D. Cockburn, Baldwinsville, N. Y., assignors to General Electric Company, a corporation of New York Application July 6, 1953, Serial No. 366,158

3 Claims. (Cl. 250—27)

This invention relates to pulse generators, and more particularly, to such generators in which clipper-amplifier circuits are employed for triggering a voltage discriminator circuit of which the output is in the form of rectangular wave voltage pulses.

For some circuit applications, especially in electronic computers and the like, it is desirable that a triggering pulse utilized to initiate an output voltage pulse obtain a predetermined amplitude at a fixed time relative to the time at which the input voltage to the circuit reaches a predetermined amplitude. However, leakage capacitance in the circuit normally introduces a delay in the time required for a voltage wave to rise to its maximum value due to the finite time required to charge the leakage capacitance. Hence, a phase delay is introduced between the input and output signals, thereby altering the desired time relation therebetween.

Moreover, in some pulse generator circuits it is desirable that the current in a particular tube be maintained at a certain predetermined level in the absence of a triggering pulse so that spurious output-voltage pulses are not produced by fluctuations in the current flowing through the tube. Such spurious output-voltage pulses are known to seriously affect the reliability of computer circuits.

It is, therefore, a principal object of this invention to provide a new and improved pulse generator in which the aforesaid disadvantages of the pulse generators heretofore described are largely eliminated.

Another object of this invention is to provide means for minimizing the normal phase delay introduced by leakage capacitance in a pulse generator circuit.

Still another object of this invention is to provide means for stabilizing a pulse generator circuit so that in the absence of a triggering pulse no undesired output pulses are produced.

The objects of this invention may be realized through the provision of a novel pulse generator having a voltage-discriminator arrangement which comprises means to clip the negative-going swing of a triggering voltage applied to the control grid of the first tube of said voltage discriminator circuit, whereby a desired temporal relationship between attainment of a predetermined amplitude by the input voltage and the attainment of such an amplitude by the triggering pulse is ensured. Means also are provided for altering the bias of a triggering-pulse generating stage in said arrangement and in accordance with the instant value of the current flowing through the voltage discriminator circuit.

Figure 1:
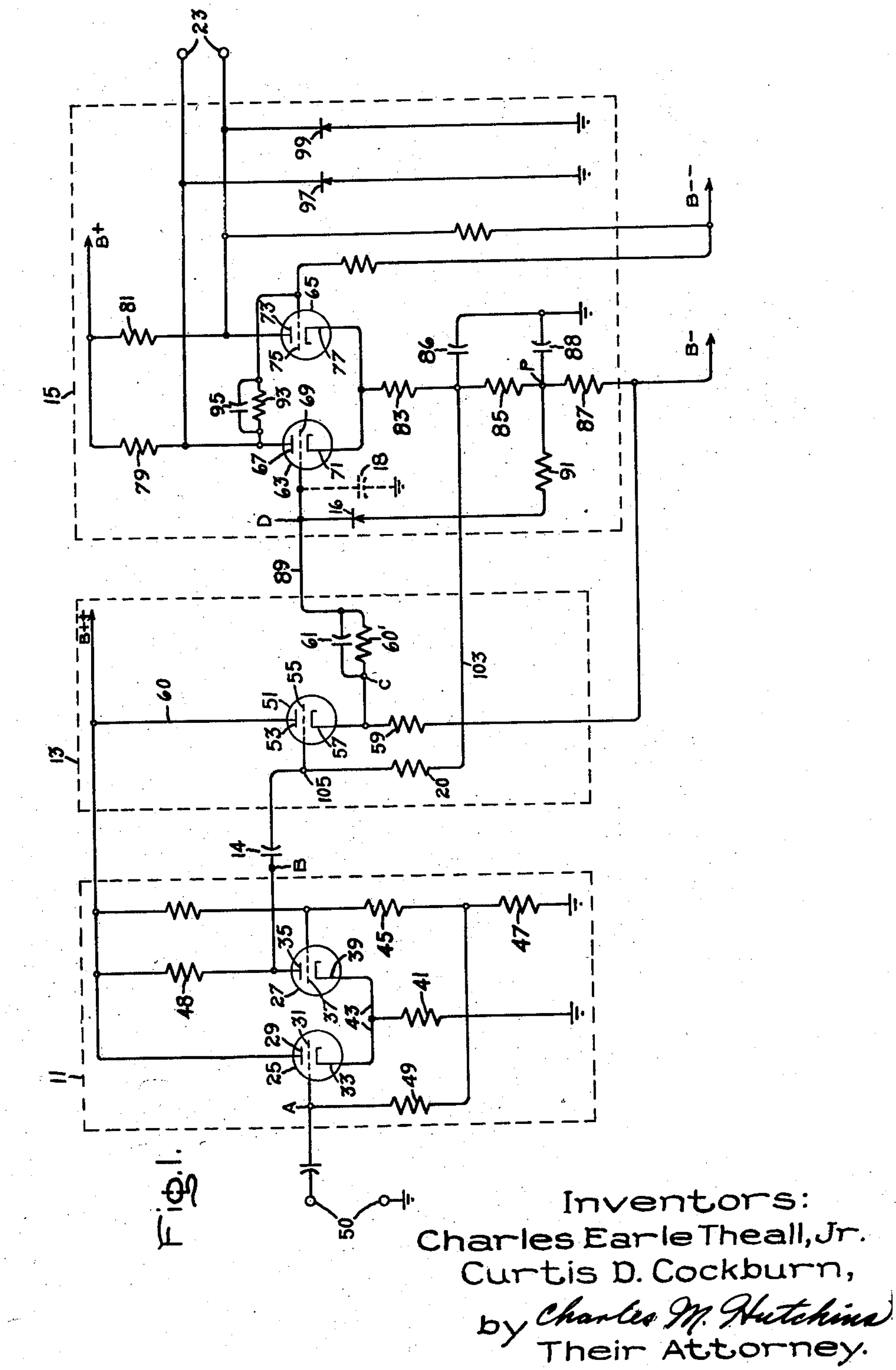
Figure 2:
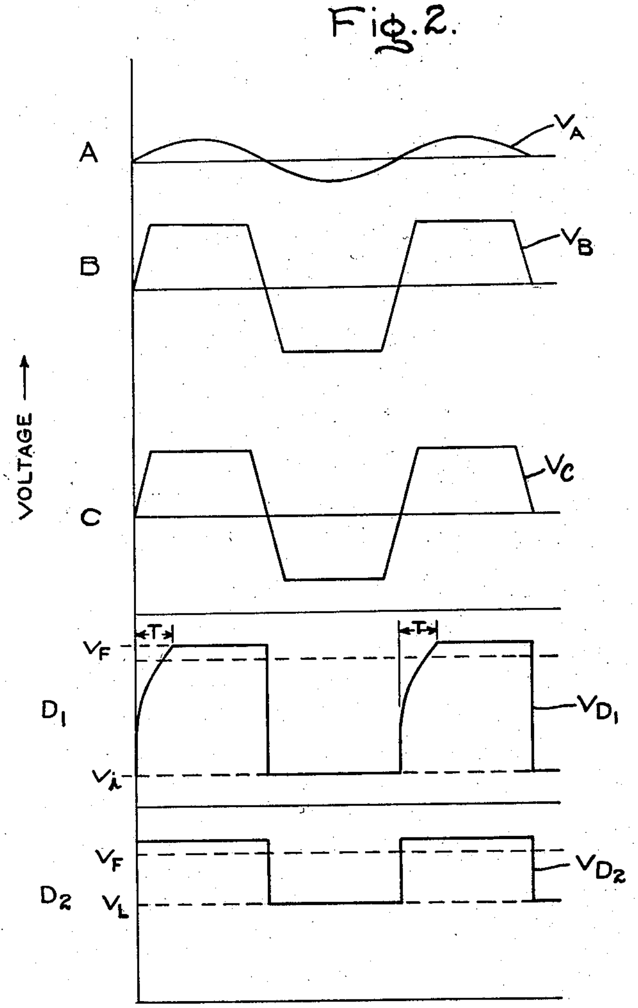

The features of this invention which are believed to be novel are set forth with particularity in the appended claims. The invention itself, however, both as to its organization and method of operation, together with further objects and advantages thereof, may best be understood by reference to the following description when read in connection with the accompanying drawings wherein:

Fig. 1 is a schematic circuit diagram of a pulse generator embodying the present invention, and Fig. 2 depicts voltage waves appearing at various locations in the circuit shown in Fig. 1.

The pulse-generator circuit of this invention is disclosed in Fig. 1 and comprises a cathode-coupled limiting amplifier 11 coupled to a cathode follower 13, which is, in turn, directly coupled to a voltage discriminator circuit 15. The amplifier 11 is arranged to receive incoming signals and to clip or limit the positive and negative half-cycles thereof and to supply a voltage wave having an approximately square wave shape to stage 13. The cathode follower stage 13 is a power amplifier which couples the output of stage 11 to the input of stage 15, the output of stage 13 being utilized as a triggering pulse for the discriminator 15. The voltage waveform at the output of stage 13 has the same shape as the output of stage 11. The discriminator 15, when triggered, provides a square wave output. A suitable power supply (not shown) provides operating voltages for the pulse-generator circuit through terminals including a high-positive terminal B++, a low positive terminal B+, a grounded terminal, a high-negative terminal B——, and a low-negative terminal B—.

Stage 11 may be a conventional limiting-amplifier circuit and comprises tubes 25 and 27 having plate, grid, and cathode electrodes 29, 31 and 33, respectively, for tube 25; and 35, 37 and 39, respectively, for tube 27. The tube 25 is connected as a cathode follower, the output therefrom being derived from a cathode resistor 41 which is connected between cathode 33 and ground. Cathodes 33 and 39 are directly connected, as by a conductor 43. The grid 37 of the tube 27 is connected to ground through biasing resistors 45 and 47. Since resistor 41 is connected between the directly-connected cathodes and ground, the output signal from tube 25, which is developed across resistor 41, is impressed between the grid 37 and the cathode 39 of the tube 27. This signal appearing across resistor 41 is thus the input signal for tube 27 and an amplified version thereof appears across a plate load resistor 48 of the tube 27.

The output signal from the tube 27 is clipped or limited at its negative and positive peaks. This limiting action is caused by the bias applied to the grids 31 and 37 by resistors 45, 47 and 49, and, as is well-known, a positive-going signal applied to the grid 31 from input terminals 50 causes the upper terminal of resistor 41 to become more positive with respect to ground. This causes the grid 37 of the tube 27 to become more negative with respect to the cathode 39. The bias applied to the tube 27 is near the cut-off bias, and as the voltage applied to grid 31 becomes more positive, the voltage of the grid 37 relative to the cathode 39 becomes more negative and passes the cut-off point for the tube 27 thus limiting the positive-going swing of the input signal.

The limiting of the negative swing of the input signal is caused by the negative-going signal applied to the terminals 50 passing the cut-off point of tube 25, the resistor 49 biasing tube 25 near cut-off. Thus both the positive and the negative portions of the input signal are clipped, and the output voltage that is derived from the stage 11 has a waveform as shown in Fig. 2B. The output from stage 11 is coupled to the cathode-follower stage 13, as by a capacitor 14.

The cathode-follower stage 13 may include a vacuum tube 51 having plate, grid, and cathode electrodes 53, 55 and 57, respectively. A cathode output resistor 59 is connected between the cathode 57 and the B— terminal of the power supply. The plate 53 is connected to the B++ terminal of the power supply by a conductor 60. The output voltage developed across the cathode resistor 59 is directly coupled through a resistor 60 to the stage 15.

A capacitor 61 is connected across the resistor 60 to improve the high frequency response of the circuit.

A clipping diode 16 is connected to the input of stage 15 to minimize the effects of stray capacitance indicated by the dotted capacitor 18 as will hereinafter be described in detail. Further, a resistor 20 is connected between the stage 15 and the stage 13 to alter the bias of the stage 13 in accordance with the current flowing through stage 15 so that in an absence of a triggering pulse the one half of the stage 15 is normally conductive and the other half thereof is normally non-conductive, as will appear.

The voltage-discriminator stage 15 comprises a pair of vacuum tubes 63 and 65 having plate, grid, and cathode electrodes 67, 69 and 71, respectively, for the tube 63 and 73, 75 and 77, respectively, for the tube 65. The plates 67 and 73 are connected through resistors 79 and 81, respectively, to the B+ terminal of the power supply. The cathodes 71 and 77 are directly coupled and are connected to the B− terminal of the power supply through series-connected resistors 83, 85 and 87. Alternating current signals are bypassed around resistors 85 and 87 by capacitors 86 and 88.

In describing the operation of stage 15, let it be assumed that an input lead 89 thereto is connected to a variable direct-current voltage source (not shown). When the input voltage is zero, the tube 63 is biased beyond cutoff because current flowing through the tube 65 to B− produces a voltage drop across resistors 83 and 85. A portion of this voltage drop is connected through a biasing resistor 91 and the diode 16 to the grid 69 of the tube 63, thus biasing the grid 69 negative with respect to the cathode 71 to a point past cutoff. If the input voltage is raised slowly, tube 63 starts to conduct when the magnitude of the input signal voltage brings the total grid-to-cathode voltage above the cutoff point of tube 63. This is a critical point in the operation of the voltage discriminator stage 15 because a regenerative condition sets in whereby the current flowing through the tube 65 immediately ceases, and the current flowing through the tube 63 immediately increases to its maximum value, giving a square wave output voltage.

This regenerative condition can be explained by starting at a point in time where the input signal voltage reaches a magnitude equal to the value of the bias voltage. At this time the tube 63 is not conducting. However, when the input signal increases slightly past this point, current begins to flow through the tube 63. A signal is thereby developed at the plate 67 of the tube 63 which is 180° out of phase with the signal voltage applied to the grid 69. That is, a negative signal is developed at the plate 67. This negative signal is fed through a resistor 93 and capacitor 95 to the grid 75 of tube 65, and causes a reduction of the current through the tube 65. This reduction in current causes the voltage developed across resistor 83, due to the current flowing therethrough, to drop. Since this voltage is impressed between the grid 69 and the cathode 71 of the tube 63 and is negative, a decrease therein causes an increased current to flow through the tube 63. This increased current then causes a negative pulse of voltage to be applied to the grid 75 of the tube 65 as previously described. Thus the current in the circuit increases regeneratively in tube 63, rising immediately from zero to its maximum value, and the current in the tube 65 immediately drops from maximum value to zero.

Diodes 97 and 99 are connected between the plates 67 and 73, respectively, and ground to prevent the plates to which they are connected from going highly negative when the tube starts to conduct. This is desirable since the cathodes 71 and 77 are connected to a source of high negative potential, B−, and when conduction starts, the voltage drop across the tube due to the current flowing through the circuit would normally cause the plates 71 or 77 to go negative thereby causing the plate voltage of the conducting tube to become unstable and dependent on the tube's condition and characteristics. However, the diodes 97 and 99 are poled in a direction so that plates 71 and 77 are connected directly to ground when current starts to flow, thus clamping the plates at a voltage substantially equal to ground potential rather than at the B− potential.

It is desirable in some circuit applications, for example, in binary computor circuits, that in the absence of incoming signal, that only one particular tube of the voltage discriminator be conducting, the other tube being cut off. Hence, in accordance with the present invention, the resistor 20 is connected from the point between the resistors 83 and 85 to the grid 55 of the tube 51 by the conductors 103 and 105. This direct path from the cathode circuit of the stage 15 enables the grid bias of the tube 51 to be varied in accordance with the magnitude of the current flowing through the common cathode path of tubes 63 and 65 so that an increase of current flowing therethrough positively increases the voltage applied to grid 55, thus increasing the output voltage of stage 13. The advantage of such feedback bias connection is apparent if the effect of a replacement of the tubes 63 and 65 by different tubes is considered. If the replacements have different characteristics than the tubes 63 and 65, and in particular, have higher perveance, the amount of current passing through the cathode resistors 83, 85 and 87 may be large enough to bias the grid of the tube 63 past cut-off, thus causing the circuit to "flip over" from a state which tube 63 is conducting to a state where tube 65 is conducting. In the binary computor circuit mentioned above, this would result in an error in the final result, and is thus undesirable. The perveance of a tube is defined as the amount of plate current a tube draws, at given operating voltages, relative to a normal tube operating at the same voltages. Thus, a tube having a high perveance will draw a large amount of current relative to a tube having low perveance when the operating voltages of the circuit are held constant.

Regulating the grid bias of tube 63 in accordance with current through the common cathode path of stage 15 by the bias feedback line compensates for the effect of tubes having high perveance being placed in the circuit, because the increased current through the replacement tubes in stage 15 causes a greater voltage feedback to the grid 55 and drives it more positive with respect to the cathode 57 thus causing an increase of current through the resistor 59. This increase in current causes an increased positive steady-state voltage to be applied to the grid 69 of the first tube in stage 15 thereby counteracting the tendency of the circuit "flip over" when high perveance tubes are placed in the stage 15, as described above.

In some circuits, such as in the binary computor circuit hereinabove mentioned, the zero-crossing time of the voltage in the voltage discriminator circuit must occur at the same instant as the zero-crossing time in previous stages. The term zero-crossing time is employed to designate the time at which an alternating wave reaches its mean voltage value.

This desirable feature of our invention will be described in connection with the wave-form diagram of Fig. 2 in which the graphs $V_A$, $V_B$ and $V_C$ represent the forms of the voltages appearing at the points A, B, and C, respectively, of Fig. 1.

To insure that the zero-crossing time of the output of the voltage discriminator stage 15 occurs at the same time as the zero-crossing time of the voltage $V_C$ and hence the input voltage at point A, the voltage appearing at point D (Fig. 1), illustrated in Fig. 2 at $V_D$, must cross the hereinabove described critical voltage level $V_F$ at the same time that the voltage at point C crosses a comparable level. If this condition is met, the voltage output of the voltage discriminator stage 15 will have the same phase as the voltage applied at the input of stage 11. However, as noted above, the stray capacitance in the circuit wiring and the input capacitance of the tube 63, as indicated by the dotted capacitor 18, tend to delay the time when voltage $V_D$ crosses the critical point $V_F$ by a time T as shown by Fig. $2D_1$. The time T indicated in Fig. $2D_1$ is the time by which the rise portion of the voltage $V_{D1}$ to the critical value $V_F$ is delayed and corresponds to the time required to charge the capacitor 18.

In accordance with the present invention, the clipping diode 16 is connected between point D and a point P between the resistors 85 and 87 to correct the time delay T caused by the capacitor 18.

The waveform $V_{D1}$ indicates the voltage wave that would appear at the point D if the diode 16 were not connected to the grid 69, while the waveform $V_{D2}$ indicates the waveform that appears considering the effect of the diode 16 on the voltage at point D. When the voltage at point D becomes less than the voltage at point P, the diode 16 permits flow of current to the grid 69 and thus clips or limits the negative-going swing of $V_{D2}$ at a level $V_L$.

The time required for a capacitor to become charged to a given voltage level is a function of the time constant of the charging circuit, the final voltage level to which the capacitor is to be charged, and the initial value of voltage from which the capacitor began charging, the charging time decreasing as the difference between the final voltage level and the initial voltage level decreases. When the diode 16 is connected into the circuit, neither the circuit time constant nor the final voltage level is substantially changed. However, the voltage level at the beginning of capacitor charging is raised from the level $V_1$ (Fig. $2D_1$) to $V_L$ (Fig. $2D_2$). The difference between the final voltage level and the initial voltage level is thereby decreased, decreasing the time delay T to a negligibly small value. As a result $V_{D2}$ reaches the critical firing voltage value, $V_F$ at substantially the same time as it would if the leakage capacitance 18 were not present. The relative phase of the voltage output of the voltage discriminator stage 15 at terminals 23 and the input voltage at terminal 50 is thus maintained.

While one specific embodiment has been shown and described, it will, of course, be understood that various modifications may be made without departing from the invention. The appended claims are, therefore, intended to cover any such modifications within the true spirit and scope of the invention.

What we claim as new and desire to secure by Letters Patent of the United States is:

1. In combination with a voltage discriminator circuit including a pair of electron discharge devices with mutual coupling means for maintaining said discharge devices in opposite states of conduction relative to one another, said mutual coupling means including a common-cathode resistor, driving means for said discriminator including a cathode-follower stage including a control grid, means for varying the bias of said control grid of said cathode-follower stage directly in accordance with the current flowing through said common-cathode resistor of said voltage discriminator circuit, and means for clipping the negative swing of a voltage fed from said cathode-follower stage to a control grid of said voltage discriminator circuit at a level varying directly with the magnitude of the current flowing through said common cathode resistor.

2. In combination, a voltage discriminator circuit including a pair of electron discharge devices with mutual coupling means for maintaining said discharge devices in opposite states of conduction relative to one another, said coupling means including a common cathode resistor, a cathode follower stage including at least a grid and a cathode for supplying triggering pulses to said voltage discriminator circuit, means providing a direct current path between the cathode of said cathode follower stage and an input electrode of said voltage discriminator circuit, and means connecting said grid and cathode of said cathode follower stage across said common cathode resistor with a polarity such that an increase in current through said common cathode resistor causes said grid of said cathode follower stage to become more positive with respect to the cathode thereof, thereby to increase the input electrode bias voltage of said voltage discriminator circuit when the current through said common cathode resistor increases.

3. A pulse generator comprising a first electron discharge device having a cathode, anode and control grid, and a second electron discharge device having a cathode, anode and control grid, a source of direct potentials, a source of alternating signal potentials, a first coupling means furnishing a common resistive path from both of said cathodes to the negative terminal of said source and providing signal coupling between said discharge devices, separate resistive means connecting each of said respective anodes to the positive terminal of said source, a signal input circuit coupling the alternating signals of said signal source to said first grid to alter the state of conduction of said first discharge device, said signal input circuit including means for limiting the range of grid voltage variation in the presence of an applied signal comprising a resistance and capacitance in shunt, coupled between said signal source and said first recited grid and a diode having its negative terminal coupled to said first recited grid and its positive terminal coupled to a point having a negative potential with respect to said cathodes, a second coupling means regeneratively coupling the anode of said first discharge device to the grid of said second discharge device, said two recited coupling means converting and maintaining said discharge devices in opposite states of conduction relative to one another, and output terminals coupled to at least one of said anodes for deriving pulses appearing thereat upon the occurrence of changes in conduction of said discharge devices.

References Cited in the file of this patent

UNITED STATES PATENTS

| | | |
|---|---|---|
| 2,095,742 | Haller | Oct. 12, 1937 |
| 2,276,565 | Crosby | Mar. 17, 1942 |
| 2,413,932 | Sziklai | Jan. 7, 1947 |
| 2,495,826 | Schock | Jan. 31, 1950 |
| 2,497,693 | Shea | Feb. 14, 1950 |
| 2,595,397 | Lee et al. | May 6, 1952 |
| 2,599,266 | Lester | June 3, 1952 |
| 2,644,037 | Beaufoy | June 30, 1953 |
| 2,644,887 | Wolfe, Jr. | July 7, 1953 |
| 2,653,237 | Johnstone et al. | Sept. 22, 1953 |
| 2,689,910 | Adelaar | Sept. 21, 1954 |
| 2,745,956 | Baker, Jr. | May 15, 1956 |